(12) United States Patent
Hewett et al.

(10) Patent No.: US 7,733,872 B2
(45) Date of Patent: Jun. 8, 2010

(54) SYSTEM AND METHOD FOR IMPLEMENTING QUALITY OF SERVICE FALLBACK USING RESOURCE RESERVATION PROTOCOL

(75) Inventors: Jeffrey A. Hewett, Raleigh, NC (US); Subhasri Dhesikan, San Jose, CA (US); John K. Restrick, Jr., Palo Alto, CA (US); Martin W. Wu, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 506 days.

(21) Appl. No.: 11/693,070

(22) Filed: Mar. 29, 2007

(65) Prior Publication Data
US 2008/0240109 A1    Oct. 2, 2008

(51) Int. Cl.
H04L 12/56 (2006.01)
(52) U.S. Cl. .................................. 370/395.3
(58) Field of Classification Search ................. 370/332, 370/331, 395.3, 401, 395.51, 348, 392; 709/226, 709/249, 227, 228, 231, 203, 229, 239, 230, 709/238
See application file for complete search history.

(56) References Cited

U.S. PATENT DOCUMENTS

| | | | |
|---|---|---|---|
| 6,631,122 B1 | 10/2003 | Arunachalam et al. | 370/332 |
| 6,694,247 B2 | 2/2004 | Hameleers et al. | 701/117 |
| 7,076,552 B2 | 7/2006 | Mandato | 709/226 |
| 7,123,598 B1 | 10/2006 | Chaskar | 370/331 |
| 7,489,695 B1* | 2/2009 | Ayyangar | 370/396 |
| 2002/0087699 A1 | 7/2002 | Karagiannis et al. | 709/227 |
| 2003/0172160 A9* | 9/2003 | Widegren et al. | 709/226 |
| 2006/0126630 A1 | 6/2006 | Shirazipour et al. | 370/382 |
| 2006/0182119 A1 | 8/2006 | Li et al. | 370/395.52 |
| 2006/0199588 A1* | 9/2006 | Gao et al. | 455/442 |
| 2007/0217340 A1* | 9/2007 | Nakamichi et al. | 370/252 |

OTHER PUBLICATIONS

Camarillo et al., "Integration of Resource Management and Session Initiation Protocol (SIP)," Network Working Group, pp. 1-30, Oct. 2002.

* cited by examiner

*Primary Examiner*—Dang T Ton
*Assistant Examiner*—Nourali Mansoury
(74) *Attorney, Agent, or Firm*—Baker Botts L.L.P.

(57) ABSTRACT

A system and method for implementing a Quality of Service (QoS) fallback using Resource Reservation Protocol (RSVP) includes initiating a communication session with a QoS precondition between a first domain and a second domain. It is determined whether the second domain supports the QoS precondition. Intra-domain RSVP is established in the first domain if the second domain does not support the QoS precondition.

19 Claims, 6 Drawing Sheets

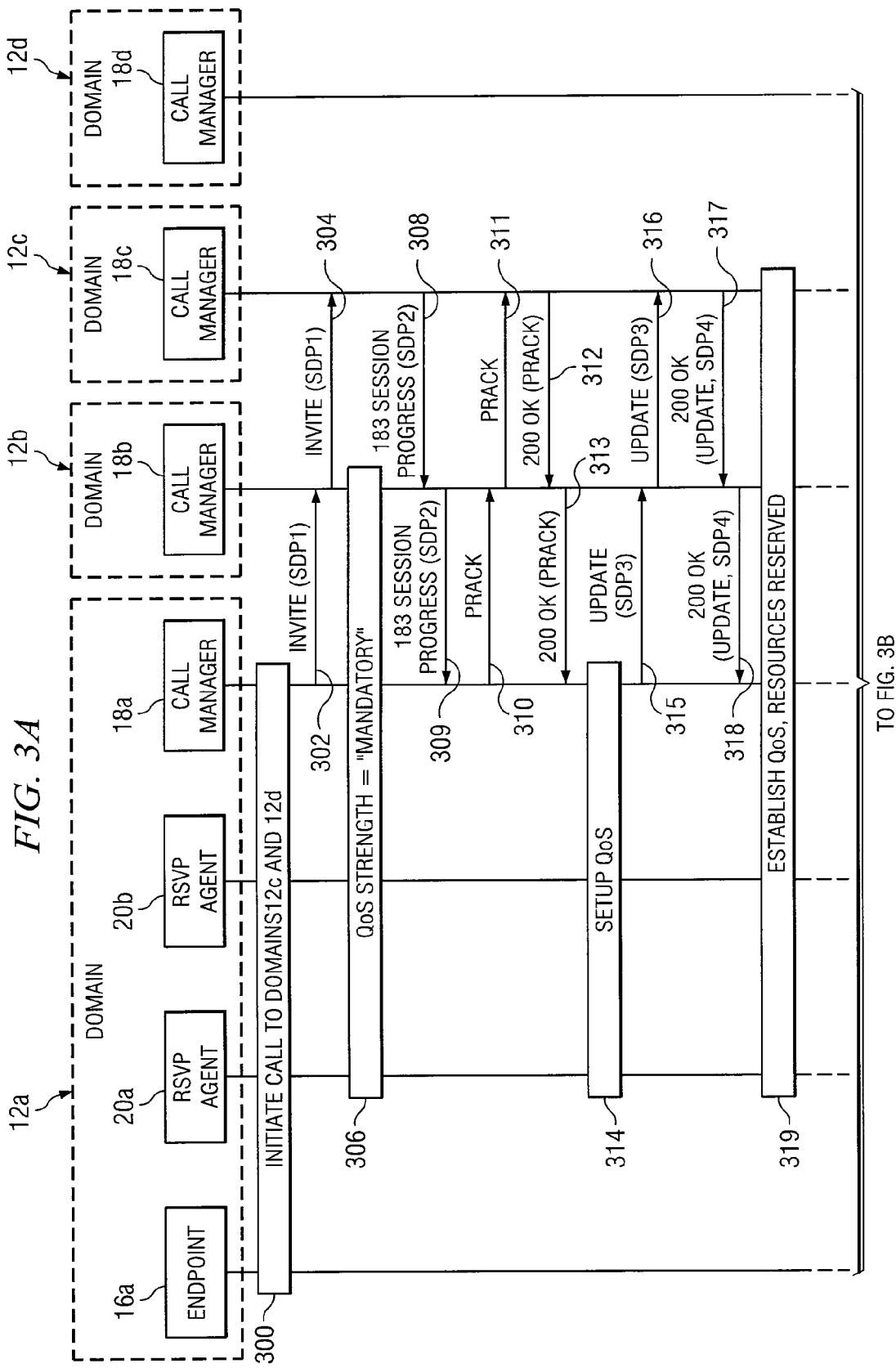

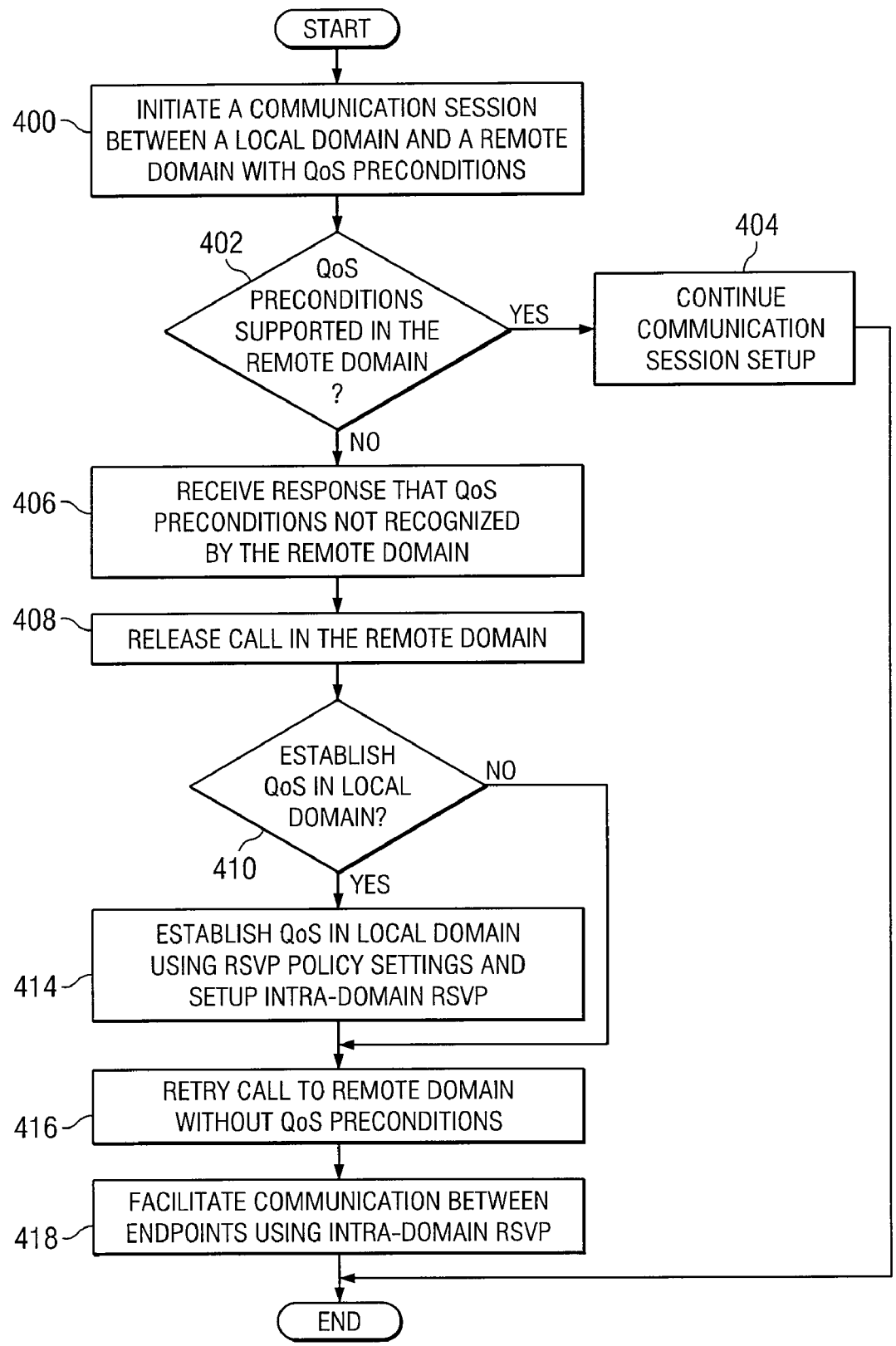

SYSTEM AND METHOD FOR IMPLEMENTING QUALITY OF SERVICE FALLBACK USING RESOURCE RESERVATION PROTOCOL

TECHNICAL FIELD

This invention relates generally to communication services, and more specifically, to a system and method for implementing quality of service fallback using Resource Reservation Protocol.

BACKGROUND

Internet Protocol-based communication services have become exceedingly popular and commonplace in today's communication environment. These communication services are enabled by various protocols and technologies. The practical difficulty in such an environment is a potential mismatch of the technology or protocol between communication systems. Such mismatches may prevent a communication session from being established.

Establishing Quality of Service (QoS) for a communication session may require domains of the communication session to support certain call signaling and preconditions, such as Resource Reservation Protocol (RSVP) and QoS preconditions. RSVP is an admission control mechanism that admits or denies requests for network resources that are needed for the communication session. A QoS failure may occur if the communication system does not support QoS preconditions and RSVP. The QoS failure may cause the session to be aborted and not allowed to proceed.

SUMMARY OF THE DISCLOSURE

In accordance with the present invention, disadvantages and problems associated with a lack of support for RSVP and QoS preconditions and a resultant communication session failure may be reduced or eliminated.

According to one embodiment of the present invention, a system and method for implementing a QoS fallback using RSVP includes initiating a communication session with a QoS precondition between a first domain and a second domain. It is determined whether the second domain supports the QoS precondition. Intra-domain RSVP is established in the first domain if the second domain does not support the QoS precondition.

According to another embodiment, a system and method for implementing QoS fallback using Resource Reservation Protocol (RSVP) includes initiating a communication session with a QoS precondition between a first domain and a second domain. It is determined whether the first domain supports the QoS precondition. Intra-domain RSVP is established in the second domain if the first domain does not support the QoS precondition.

Certain embodiments of the invention may provide one or more technical advantages. A technical advantage of one embodiment may be that the communication session secures QoS in its local domain even if RSVP and QoS preconditions are not supported in other domains involved in the communication session. The domains negotiate the QoS requirements between them to procure the necessary QoS permissions needed for the session. The communication session may proceed with QoS over a portion of the path rather than the communication session proceeding without any QoS. QoS fallback does not require a signaling exchange between domains. Therefore, QoS fallback may be implemented even if the other domain does not support the necessary QoS preconditions or RSVP. Another technical advantage of an embodiment may be that the communication may not fail because of the lack of support for RSVP and QoS preconditions in other domains. Another technical advantage of yet another embodiment may be that the communication session may be deployed or upgraded in pieces. Therefore, a communication system may be upgraded at different time periods and continue to be functional.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIGS. 3A and 3B are a call-flow diagram illustrating embodiments of end-to-end RSVP between domains and QoS failback in a domain; and FIG. 4 is a flowchart illustrating one embodiment of a method of utilizing QoS fallback in a domain.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
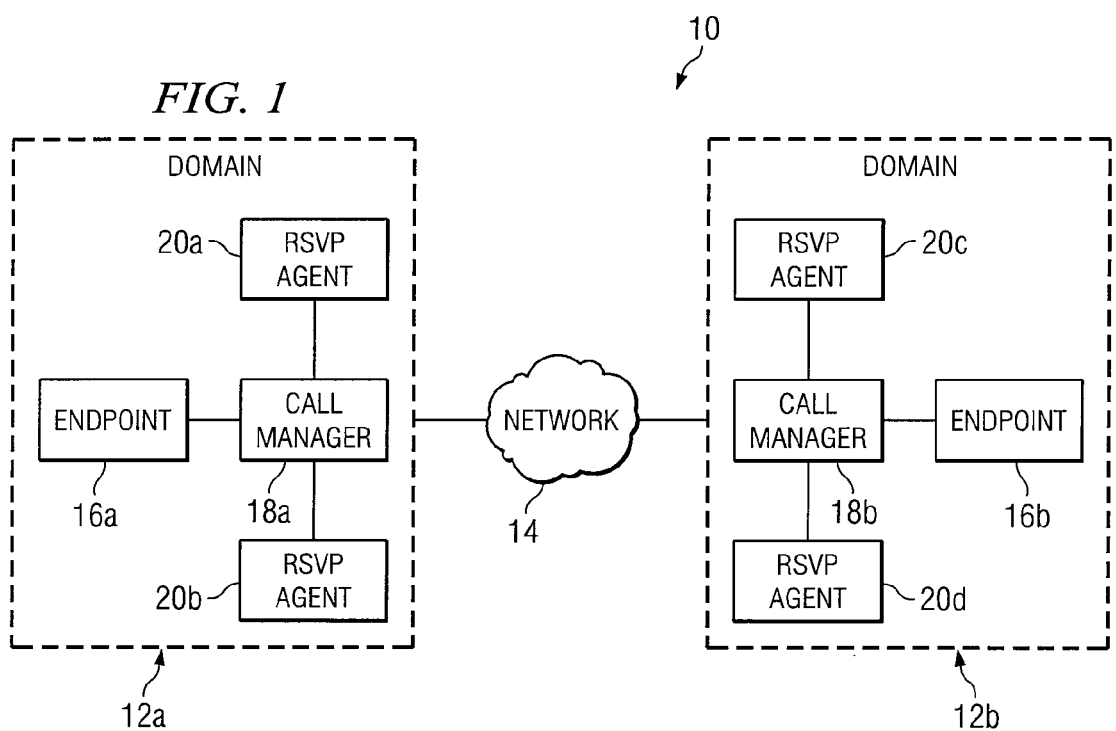
FIG. 1 is a block diagram of one embodiment of a system for implementing QoS fallback using RSVP.

FIG. 1 is a block diagram of one embodiment of a system 10 for implementing QoS fallback using RSVP. System 10 includes domains 12 that facilitate communication sessions between endpoints 16 over a network 14. Endpoints 16 in different domains 12 may use QoS during the communication session. According to an embodiment, if QoS is not supported in each domain 12, call manager 18 may implement QoS fallback to secure QoS within its local domain 12. QoS is secured for at least a portion of the information path within the local domain 12, and information is given priority treatment in this portion.

System 10 may include any suitable number of domains 12. Domains 12 represent a logical grouping of components in system 10 that share an administrator. For example, an administrator handles domain 12a and another administrator handles domain 12b. Domains 12 are not necessarily based on geographic location. Domains 12 may comprise, for example, a cluster, a call system, an enterprise, or any suitable grouping of components. Domains 12 may communicate with each other using any suitable technique, such as network 14 or a trunk. In an embodiment, the communication protocol used between domains 12 is Session Initiation Protocol (SIP). Domain 12 may include any suitable component. In the illustrated embodiment, each domain 12 comprises an endpoint 16, a call manager 18, and RSVP agents 20.

System 10 includes any suitable number of endpoints 16 that participate in communication sessions with endpoints 16. In an embodiment, the communication session is established between endpoints 16 in different domains 12. For example, endpoint 16a in domain 12a establishes a communication session with endpoint 16b in domain 12b.

Endpoint 16 may communicate information such as data, audio, video, multimedia, any other suitable type of information, or any suitable combination of the preceding. For example, endpoints 12 may participate in packet-based communication where voice information is communicated through packets. The communication may be in the form of a call, a message, or any other suitable form of communication.

Endpoints 16 may comprise, for example, an Internet Protocol (IP) telephone, a computer supporting a telephony application, or any other endpoint suitable for communicating in system 10. Endpoints 16 include hardware, software, or any suitable combination of the preceding to facilitate communication. Endpoints 16 may support, for example, IP, SIP, Skinny Client Control Protocol (SCCP), H.323, or any other suitable device or call control communication protocols, or any suitable combination of the preceding.

Call manager 18 facilitates the exchange of information between domains 12. For example, the information may be exchanged between endpoints 16 in the same domain 12 and/or endpoints 16 in different domains 12. In one embodiment, call manager 18 represents the administrator of domain 12 and may be responsible for RSVP signaling and QoS fallback. QoS fallback establishes QoS and supports RSVP in a local domain 12 if end-to-end RSVP is not available, that is, QoS fallback supports intra-domain RSVP. By supporting intra-domain RSVP, bandwidth may be reserved between RSVP agents 20 in local domain 12.

Call manager 18 may support QoS preconditions as discussed in Request for Comments (RFC) 3312 and may support RSVP via RSVP agents 20. QoS preconditions represent any suitable QoS requirements that must be met in system 10 before endpoint 16 is notified of an incoming call. For example, call manager 18 may be configured to support QoS between domains 12 (end-to-end RSVP) and QoS fallback.

RSVP agents 20 facilitate the reservation of bandwidth on behalf of endpoints 16. RSVP agents 20 control the implementation of RSVP by determining the available bandwidth and making reservations on behalf of endpoints 16. In the illustrated embodiment, each domain 12 includes multiple RSVP agents 20 to facilitate local QoS and intra-domain RSVP.

Network 14 represents a packet-based network that allows components of system 10 to communicate with other networks, domains 12, endpoints 16, or other components of system 10. Network 14 provides support for any suitable network-layer protocol, such as IP or RSVP. Network 14 may include at least a portion of one or more of the following: metropolitan area network (MAN), a local area network (LAN), a wide area network (WAN), any other public or private data network, a local, regional, or global communication network, such as the Internet, an enterprise intranet, other suitable wireline or wireless communication link, or any suitable combination of the preceding. Network 14 may include any combination of gateways, routers, hubs, switches, access points, base stations, trunks, and/or any other hardware and/or software that may implement any suitable protocol or communication. For example, network 14 supports any suitable device or call control protocol, such as SIP, H.323, SCCP, any other suitable communication protocol, or any suitable combination of the preceding. In an embodiment, a SIP trunk is used between domains 12 to facilitate the communication.

In an example of an embodiment of operation, system 10 comprises endpoints 16 that may use QoS during a communication session. Endpoint 16a in domain 12a initiates a communication session with endpoint 16b in domain 12b. During the attempt to establish the session, endpoint 16a requests a specific QoS level for the communication session. Endpoint 16b may accept or reject the QoS preconditions that endpoint 16a requests. A precondition response is transmitted that informs domain 12a whether endpoint 16b supports the QoS precondition or whether the precondition can be met. In the example, endpoint 16b does not support the QoS precondition.

Rather than terminating the communication session because of the unsupported QoS precondition, call manager 18a in domain 12a implements QoS fallback to locally provide QoS in domain 12a. Call manager 18a releases the attempted communication to endpoint 16b and facilitates the setup of QoS in domain 12a using RSVP agents 20a and 20b. Following the establishment of QoS in domain 12a, call manager 18a re-attempts the call setup with domain 12b. The communication session is established between endpoints 16a and 16b, with the local provision of QoS in domain 12a.

Modifications, additions, or omissions may be made to system 10 without departing from the scope of the invention. For example, each domain 12 may include any suitable number of endpoints 16 and RSVP agents 20. As another example, any domain 12 in system 10 may implement QoS fallback and establish intra-domain RSVP if the other domain(s) 12 in system 10 do not support the QoS preconditions. Moreover, the operations of system 10 may be performed by more, fewer, or other components. Any suitable logic comprising software, hardware, other logic embodied in a computer readable medium, or any suitable combination of the preceding may perform the functions of system 10.

Figure 2A:
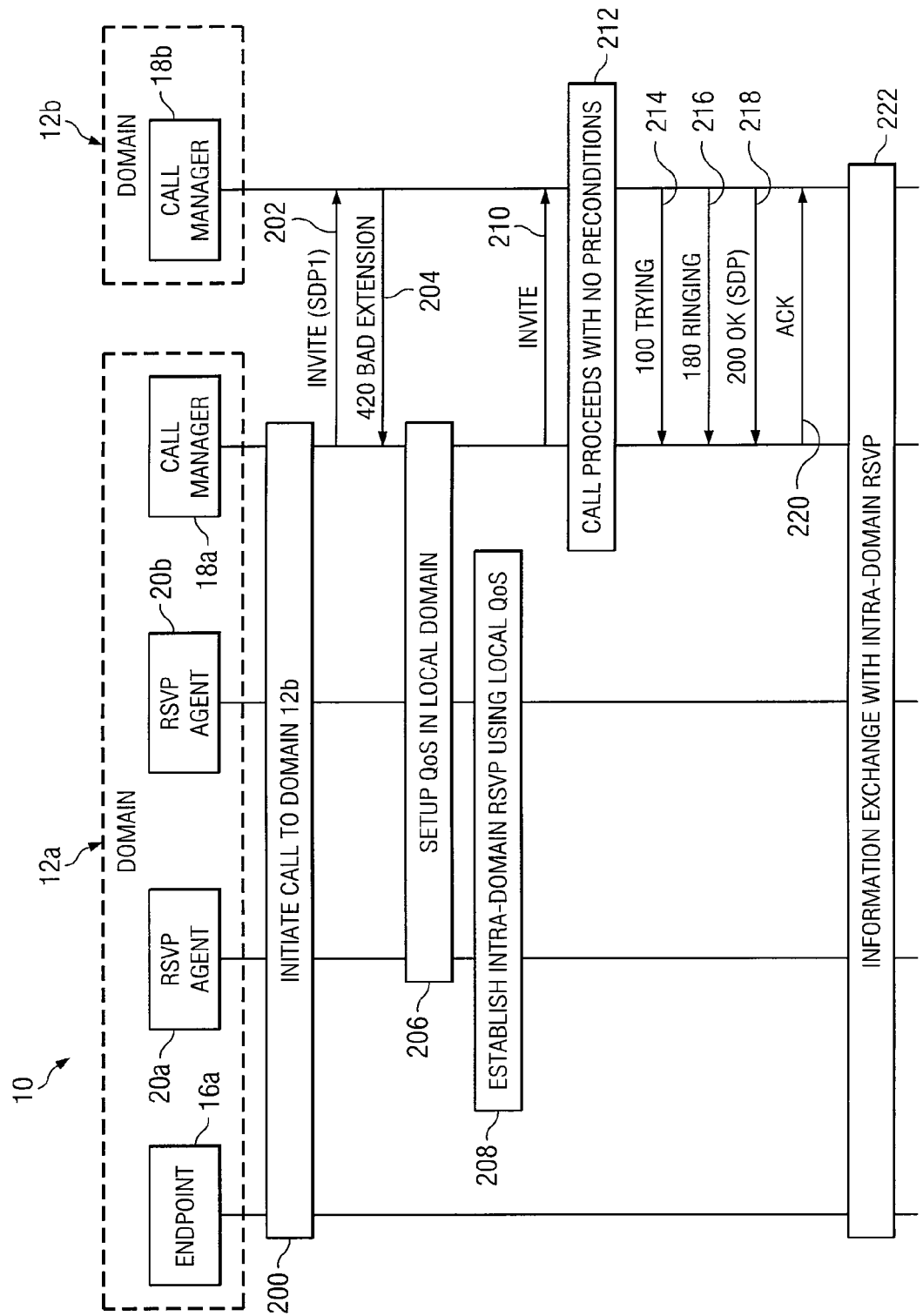
FIG. 2A is a call-flow diagram illustrating an embodiment of a caller utilizing QoS fallback in a domain.

FIG. 2A is a call-flow diagram illustrating an embodiment of a caller utilizing QoS fallback in domain 12. As discussed above, QoS fallback provides for call completion and establishment of intra-domain RSVP if end-to-end RSVP is not supported. Endpoint 16a initiates a call to an endpoint 16 in domain 12b at 200. In the illustrated embodiment, endpoint 16a supports end-to-end RSVP and attempts to use QoS during the communication.

Call manager 18a transmits an INVITE to call manager 18b in domain 12b in message 202. The INVITE includes the information to establish the call, such as port information and QoS preconditions. Call manager 18a does not know prior to sending the INVITE whether domain 12b supports QoS preconditions, so call manager 18a includes the preconditions in the INVITE.

In the illustrated embodiment, domain 12b does not support the QoS preconditions. Therefore, call manager 18b responds with a 420 Bad Extension in message 204. The 420 Bad Extension informs call manager 18a that the QoS precondition in the INVITE message was not recognized. Therefore, QoS cannot be established between domains 12a and 12b. Because domain 12b does not support the QoS preconditions, call manager 18a facilitates the establishment of intra-domain RSVP.

During the establishment of intra-domain RSVP, the call is terminated with domain 12b, but the call with endpoint 16a is maintained, so endpoint 16a is unaware of the end-to-end RSVP failure. Call manager 18a and RSVP agent 20a exchange messages at 206 to setup QoS in domain 12a. These messages may be used to allocate another RSVP agent 20 to participate in intra-domain RSVP. RSVP agents 20a and 20b exchange messages in 208 to establish the intra-domain RSVP using the local QoS.

Once intra-domain RSVP is established, call manager 18a initiates the call with domain 12b without the QoS preconditions. Call manager 18a sends an INVITE to call manager 18b in message 210 that does not include the QoS preconditions. The call proceeds with no preconditions at 212. Call manager 18b informs call manager 18a of the call attempt by transmitting a 100 TRYING in message 214 and a 180 RINGING in message 216. Call manager 18b transmits a 200 OK to call manager 18a in message 218, and call manager 18a responds with an ACK in message 220. Information may be exchanged between domains 12a and 12b using intra-domain RSVP in 222.

Modifications, additions, or omissions may be made to the call-flow diagram. For example, call manager 18a and RSVP agent 20a may exchange any suitable messages to setup QoS in domain 12a. As another example, RSVP agents 20a and 20b may exchange any suitable messages to establish intra-domain RSVP. The order of messages may vary according to the network type, configuration, and protocols in use between elements. Although described in a particular sequence, messages in the call-flow diagram may occur serially or in parallel in any suitable order.

Figure 2B:
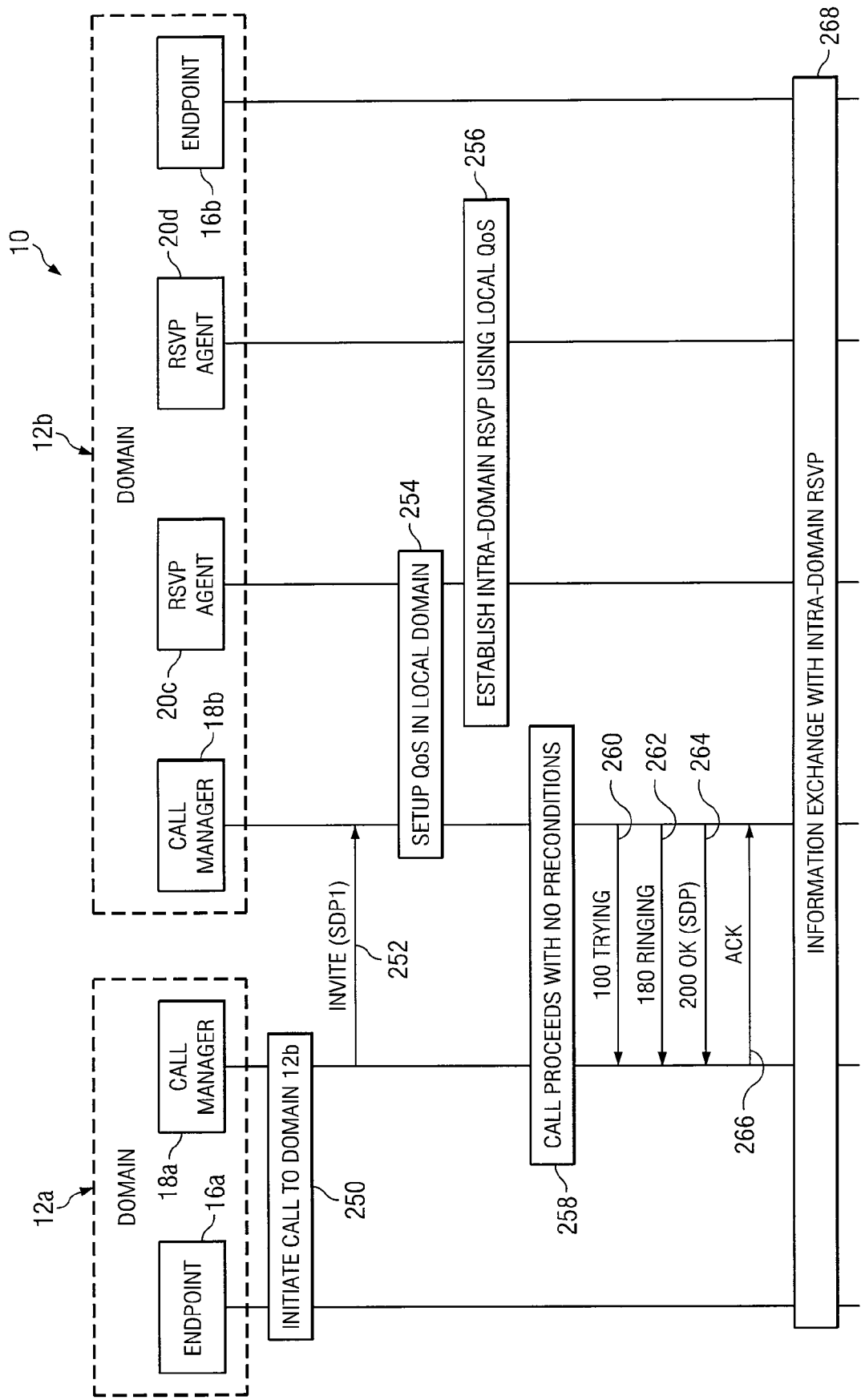
FIG. 2B is a call-flow diagram illustrating an embodiment of a callee utilizing QoS fallback in a domain.

FIG. 2B is a call-flow diagram illustrating an embodiment of a callee utilizing QoS fallback in domain 12. Endpoint 16a initiates a call to an endpoint 16b in domain 12b at 250. In the illustrated embodiment, endpoint 16b supports end-to-end RSVP and attempts to use QoS during the communication, and endpoint 16a does not support end-to-end RSVP.

Call manager 18a transmits an INVITE to call manager 18b in domain 12b in message 252. The INVITE includes the information to establish the call, such as port information. As mentioned above, endpoint 16a does not support end-to-end RSVP so the INVITE does not include QoS preconditions.

Because domain 12b supports QoS preconditions, but domain 12a does not, QoS fallback is implemented in domain 12b to establish intra-domain RSVP. Call manager 18b and RSVP agent 20c exchange messages at 254 to setup QoS in domain 12b. These messages may be used to allocate another RSVP agent 20 to participate in intra-domain RSVP. RSVP agents 20c and 20d exchange messages in 256 to establish the intra-domain RSVP using the local QoS.

Once intra-domain RSVP is established, the call proceeds without the QoS preconditions in 258. Call manager 18b transmits a 100 Trying to call manager 18a in message 260 and transmits a 180 Ringing to call manager 18a in message 262. Call manager 18b transmits a 200 OK to call manager 18a in message 264, and call manager 18a responds with an acknowledgement in message 266. Information may be exchanged between domains 12a and 12b with domain 12b implementing QoS fallback and establishing intra-domain RSVP.

Modifications, additions, or omissions may be made to the call-flow diagram. For example, the call-flow may include additional messages to implement QoS fallback by the callee. The order of messages may vary according to the network type, configuration, and protocols in use between elements. Although described in a particular sequence, messages in the call-flow diagram may occur serially or in parallel in any suitable order.

Figure 3B:
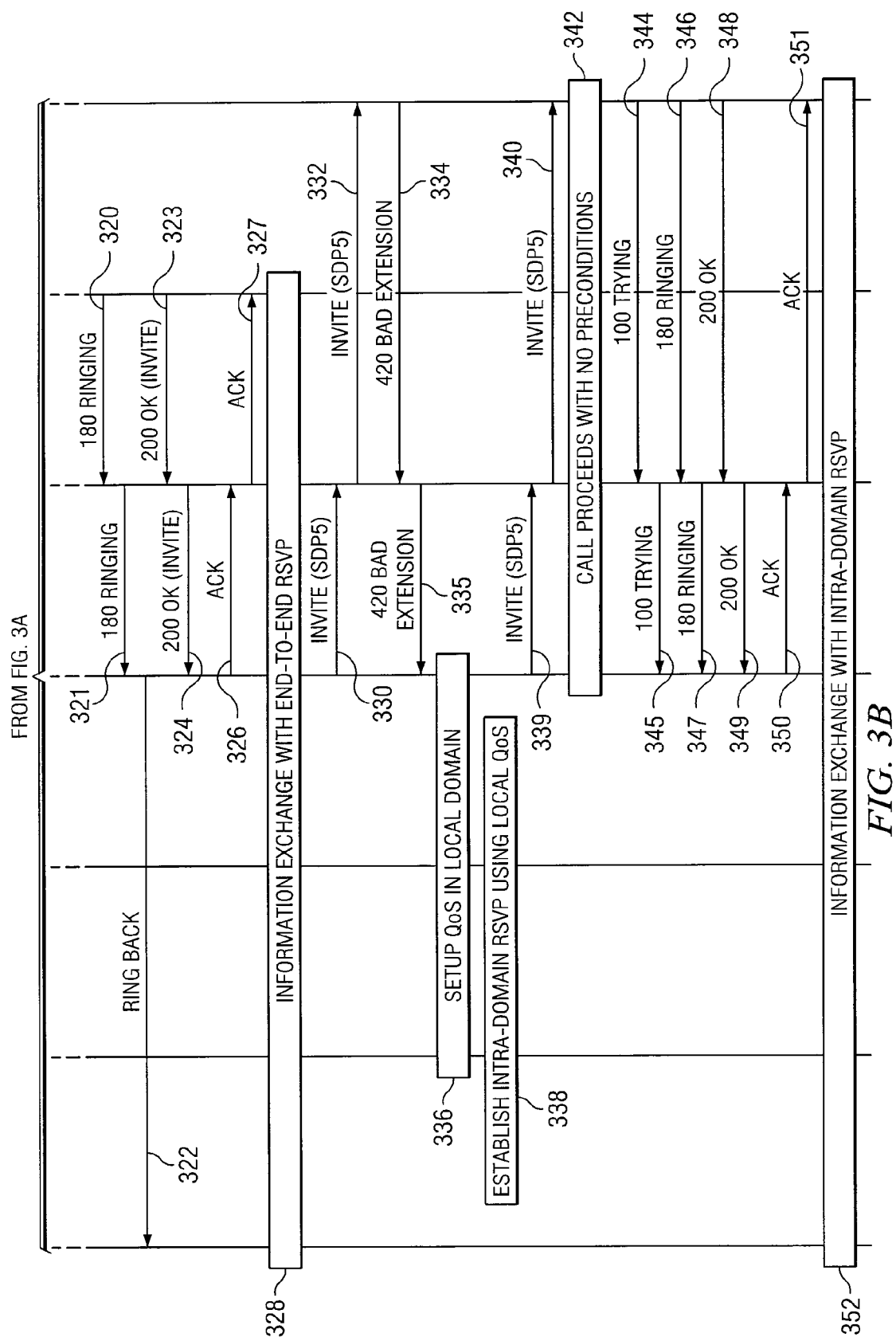

FIGS. 3A and 3B are a call-flow diagram illustrating embodiments of end-to-end RSVP between domains 12 and QoS failback. Messages 302 through 328 illustrate a successful call setup with end-to-end RSVP, and messages 330 through 352 illustrate QoS fallback when QoS preconditions are not supported in each domain 12. In the illustrated embodiment, call manager 18b acts as a centralized call manager that facilitates communication between call managers 18a, 18c, and 18d. Although not specifically depicted in FIGS. 3A and 3B, messages between call managers 18a, 18c, and 18d may proceed on a hop-by-hop basis with call manager 18b acting as an intermediary that forwards messages among call managers 18.

At 300, endpoint 16a initiates a call to domains 12c and 12d, which are administered by call managers 18c and 18d, respectively. Call manager 18a transmits an INVITE to centralized call manager 18b in message 302 that includes information to establish the call, such as port information and the QoS preconditions. Call manager 18b forwards the INVITE to call manager 18c in message 304. In the illustrated embodiment, the QoS strength is mandatory, as shown in 306.

Call manager 18c transmits a 183 Session Progress in message 308 that indicates the progress. Call manager 18b forwards the 183 Session Progress to call manager 18a in message 309. Call manager 18a responds with a provisional acknowledgement in message 310, which call manager 18b forwards to call manager 18c in message 311. Call manager 18c transmits a 200 OK in message 312, and call manager 18b forwards the 200 OK to call manager 18a at message 313. Call manager 18a and RSVP agent 20a setup the QoS in 314. Call manager 18a sends an UPDATE in message 315, which call manager 18b forwards to call manager 18c in message 316, that informs call manager 18c of the QoS. Call manager 18c responds in message 317 with a 200 OK, and call manager 18b forwards the 200 OK to call manager 18a in message 318. At 319, the QoS is established and the resources are reserved between domains 12a and 12c.

Call manager 18c proceeds with the call attempt by transmitting a 180 Ringing message to call manager 18b in message 320, and call manager 18b forwards the 180 Ringing message to call manager 18a in message 321. Call manager 18a rings endpoint 16a in message 322. Call manager 18c responds to the INVITE received in message 304 by transmitting a 200 OK to call manager 18b in message 323, which call manager 18b forwards to call manager 18a in message 324. Call manager 18a responds with an acknowledgement in message 326, and call manager 18b forwards the acknowledgment to call manager 18c in message 327. The information exchange proceeds in 328 between endpoint 16a and domain 12c with end-to-end RSVP.

In 300, endpoint 16a also attempts to initiate a call to domain 12d. Call manager 18a transmits an INVITE to centralized call manager 18b in message 330, and call manager 18b forwards the INVITE to call manager 18d in message 332. In message 330, call manager 18a sends an INVITE to call manager 18b, which is forwarded to call manager 18d in message 332. The INVITE comprises information to establish the call, such as port information and the QoS preconditions.

In the illustrated embodiment, domain 12d does not support the QoS preconditions. Therefore, call manager 18d transmits a 420 Bad Extension to call manager 18b in message 334, which call manager 18b forwards to call manager 18a in message 335. Call manager 18a enables QoS fallback and the QoS setup in domain 12a begins in 336. RSVP agent 20a and RSVP agent 20b exchange messages in 338 to establish intra-domain RSVP using the local QoS.

Call manager 18a now retries the call to call manager 18d without the QoS preconditions. Call manager 18a transmits an INVITE to call manager 18b in message 339, which call manager 18b forwards to call manager 18d in message 340. The call may proceed without QoS preconditions in 342. Call manager 18d attempts the call and transmits a 100 Trying to call manager 18b in message 344, and call manager 18b forwards the 100 Trying to call manager 18a in message 345. Call manager 18d transmits a 180 Ringing in message 346 to call manager 18b, which call manager 18b forwards to call manager 18a in message 347. Call manager 18d responds to the INVITE received in message 340 by transmitting a 200 OK in message 348, which is forwarded to call manager 18a in message 349. Call manager 18a acknowledges the response in message 350, and the response is forwarded to call manager 18d in message 351. An information exchange proceeds between endpoint 16a in domain 12a and domain 12d with intra-domain RSVP in 352.

Modifications, additions, or omissions may be made to the call-flow diagram. For example, call manager 18a and RSVP agent 20a may exchange any suitable messages to setup QoS in domain 12a. As another example, RSVP agents 20a and 20b may exchange any suitable messages to establish intra-domain RSVP. The order of messages may vary according to the network type, configuration, and protocols in use between elements. Although described in a particular sequence, messages in the call-flow diagram may occur serially or in parallel in any suitable order.

FIG. 4 is a flowchart illustrating one embodiment of a method of utilizing QoS fallback in a domain. Call manager 18 in domain 12 initiates a communication session between its local domain 12 and a remote domain 12 at step 400. In the illustrated embodiment, QoS preconditions are included in the setup process. The QoS preconditions may or may not be supported in remote domain 12 at step 402. If the QoS preconditions are supported, the communication session setup continues at step 404, and the method ends.

If the QoS preconditions are not supported in remote domain 12, call manager 18 receives a response in step 406 that the QoS preconditions are not recognized by remote domain 12. At step 408, call manager 18 releases the call in remote domain 12. Call manager 18 determines at step 410 whether to establish QoS in local domain 12. For example, call manager 18 may determine if QoS fallback is enabled. If it is determined not to establish QoS, the method continues from step 416 and call manager 18 retries the call to remote domain 12 without QoS preconditions.

If call manager 18 determines to establish QoS, QoS is established in local domain 12 using the RSVP policy settings and intra-domain RSVP is set up at step 414. As discussed above in FIGS. 2, 3A, and 3B, call manager 18 exchanges messages with RSVP agent 20 to setup QoS in local domain 12. Another RSVP agent 20 may be allocated to establish intra-domain RSVP. The RSVP agents 20 exchange messages to establish intra-domain RSVP using the local QoS. If a SIP trunk facilitates the communication between domains 12, one RSVP agent 20 may associate with endpoint 16 in local domain 12 and the other RSVP agent 20 may associate with the SIP trunk. Therefore, a reservation may be made between RSVP agents 20.

Call manager 18 retries the call to remote domain 12 at step 416 without preconditions. Call manager 18 facilitates communication between endpoints 16 in local and remote domains 12, and the method subsequently ends. Intra-domain RSVP is used during the communication session.

Modifications, additions, or omissions may be made to the flowchart. For example, the remote domain 12 may implement the QoS fallback and establish intra-domain RSVP if local domain 12 does not support the QoS preconditions. As another example, the flowchart may include additional steps that further describe the establishment of QoS in local domain 12. Although described in a particular sequence, the steps in the flowchart may occur serially or in parallel in any suitable order.

Certain embodiments of the invention may provide one or more technical advantages. A technical advantage of one embodiment may be that QoS fallback does not require a signaling exchange between domains. Therefore, QoS may be secured in a local domain even if RSVP and QoS preconditions are not supported in other domains involved in a communication session. The communication may proceed with QoS over a portion of the path rather than the communication proceeding without any QoS. Another technical advantage of an embodiment may be that the communication may not fail because of the lack of support of RSVP and QoS preconditions in other domains.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for implementing a Quality of Service (QoS) failback using Resource Reservation Protocol (RSVP), comprising:
   initiating a communication session with a QoS precondition between a first domain and a second domain;
   determining whether the second domain supports the QoS precondition;
   establishing intra-domain RSVP in the first domain if the second domain does not support the QoS precondition and end-to-end RSVP is not available;
   retrying the communication session with the second domain without the QoS precondition; and
   facilitating communication between the first domain and the second domain using the intra-domain RSVP in the first domain.

2. The method of claim 1, further comprising:
   receiving a response that the second domain does not support the QoS precondition; and
   releasing the communication session in the second domain.

3. The method of claim 1, further comprising maintaining the communication session in the first domain.

4. The method of claim 1, wherein establishing the intra-domain RSVP comprises communicating with one or more RSVP agents to establish QoS in the first domain.

5. The method of claim 1, wherein establishing the intra-domain RSVP comprises:
   communicating with a first RSVP agent;
   allocating a second RSVP agent; and
   reserving bandwidth between the first RSVP agent and the second RSVP agent to establish the intra-domain RSVP.

6. The method of claim 5, wherein:
   the first RSVP agent is associated with an endpoint in the first domain; and
   the second RSVP agent is associated with a Session Initiation Protocol trunk that facilitates the communication between the first domain and the second domain.

7. A system for implementing a Quality of Service (QoS) fallback using Resource Reservation Protocol (RSVP), comprising:
   an endpoint in a first domain operable to initiate a communication session with a QoS precondition between the first domain and a second domain;
   a call manager in the first domain coupled to the endpoint, the call manager operable to:
      determine whether the second domain supports the QoS precondition; and
      establish intra-domain RSVP in the first domain if the second domain does not support the QoS precondition and end-to-end RSVP is not available;

retry the communication session with the second domain without the QoS precondition; and facilitate communication between the first domain and the second domain using the intra-domain RSVP in the first domain; and one or more RSVP agents in the first domain coupled to the call manager, the RSVP agents operable to facilitate the intra-domain RSVP in the first domain.

8. The system of claim 7, the call manager further operable to:

receive a response that the second domain does not support the QoS precondition; and release the communication session in the second domain.

9. The system of claim 7, the call manager further operable to maintain the communication session in the first domain.

10. The system of claim 7, the call manager further operable to communicate with the one or more RSVP agents to establish QoS in the first domain.

11. The system of claim 7, the call manager further operable to:

communicate with a first RSVP agent;

allocate a second RSVP agent; and reserve bandwidth between the first RSVP agent and the second RSVP agent to establish the intra-domain RSVP.

12. The system of claim 11, further comprising a Session Initiation Protocol (SIP) trunk operable to facilitate communication between the first domain and the second domain, wherein:

the first RSVP agent is associated with the endpoint in the first domain; and the second RSVP agent is associated with the SIP trunk.

13. A system for implementing a Quality of Service (QoS) fallback using Resource Reservation Protocol (RSVP), comprising:

means for initiating a communication session with a QoS precondition between a first domain and a second domain;

means for determining whether the second domain supports the QoS precondition;

means for establishing intra-domain RSVP in the first domain if the second domain does not support the QoS precondition and end-to-end RSVP is not available;

means for retrying the communication session with the second domain without the QoS precondition; and means for facilitating communication between the first domain and the second domain using the intra-domain RSVP in the first domain.

14. A method for implementing a Quality of Service (QoS) fallback using Resource Reservation Protocol (RSVP), comprising:

initiating a communication session with a QoS precondition between a first domain and a second domain;

determining whether the first domain supports the QoS precondition;

establishing intra-domain RSVP in the second domain if the first domain does not support the QoS precondition and end-to-end RSVP is not available;

retrying the communication session with the first domain without the QoS precondition; and facilitating communication between the first domain and the second domain using the intra-domain RSVP in the second domain.

15. The method of claim 14, further comprising:

receiving a response that the first domain does not support the QoS precondition; and releasing the communication session in the first domain.

16. The method of claim 14, further comprising maintaining the communication session in the second domain.

17. The method of claim 14, wherein establishing the intra-domain RSVP comprises communicating with one or more RSVP agents to establish QoS in the second domain.

18. The method of claim 14, wherein establishing the intra-domain RSVP comprises:

communicating with a first RSVP agent;

allocating a second RSVP agent; and reserving bandwidth between the first RSVP agent and the second RSVP agent to establish the intra-domain RSVP.

19. The method of claim 18, wherein:

the first RSVP agent is associated with an endpoint in the second domain; and the second RSVP agent is associated with a Session Initiation Protocol trunk that facilitates communication between the first domain and the second domain.

* * * * *

UNITED STATES PATENT AND TRADEMARK OFFICE
CERTIFICATE OF CORRECTION

| | |
|---|---|
| PATENT NO. | : 7,733,872 B2 |
| APPLICATION NO. | : 11/693070 |
| DATED | : June 8, 2010 |
| INVENTOR(S) | : Jeffrey A. Hewett et al. |

Page 1 of 1

It is certified that error appears in the above-identified patent and that said Letters Patent is hereby corrected as shown below:

Col. 8, Ln. 19: Before "using Resource" delete "failback" and insert --fallback--;

Col. 9, Ln. 14: Before "using Resource" delete "failback" and insert --fallback--.

Signed and Sealed this

Seventh Day of September, 2010

David J. Kappos
*Director of the United States Patent and Trademark Office*